E. A. WOOD.
Steam Gage.
No. 69,737. Patented Oct. 8, 1867.
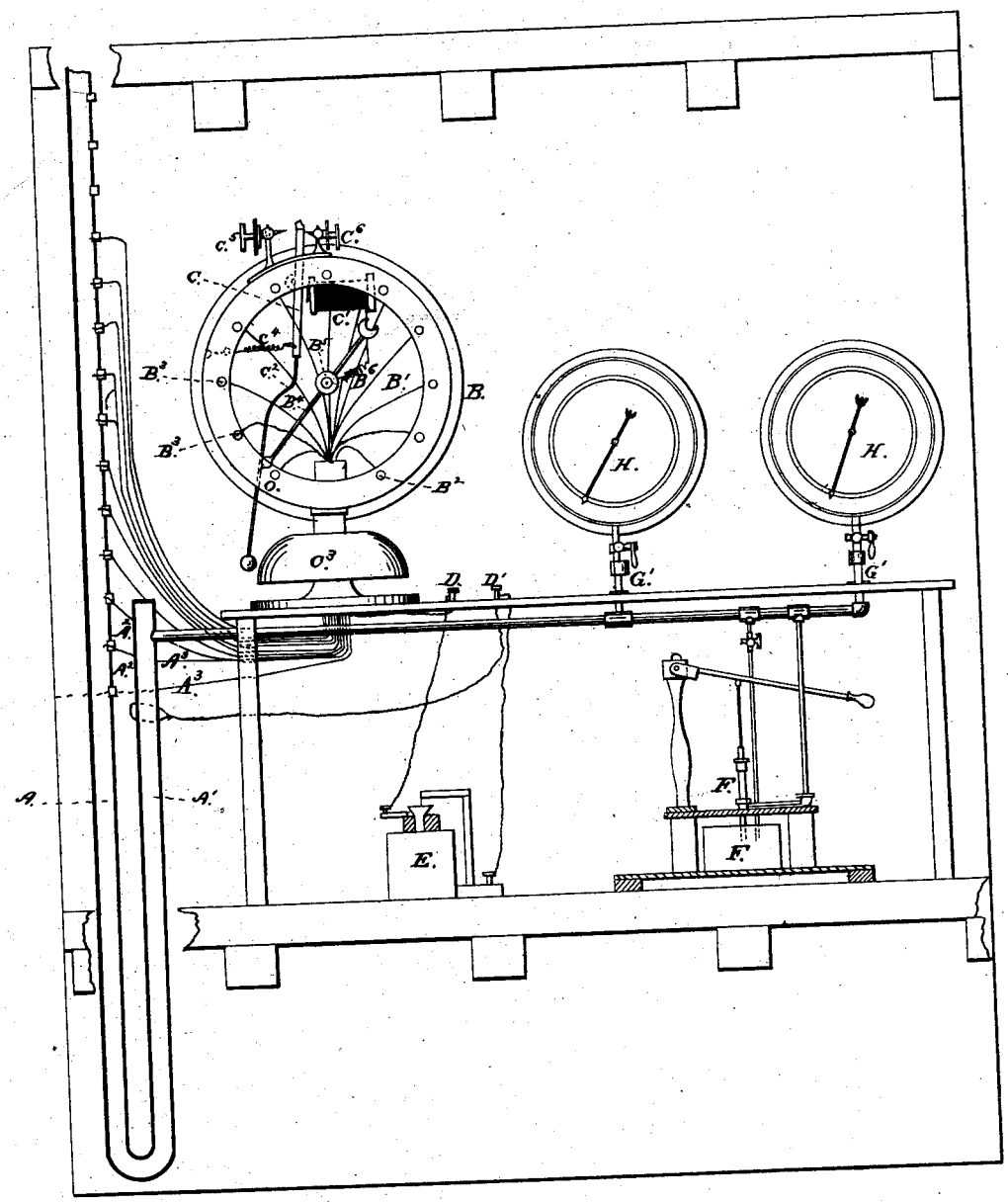
Witnesses:
Inventor:

United States Patent Office.

EDWIN A. WOOD, OF UTICA, NEW YORK.

Letters Patent No. 69,737, dated October 8, 1867.

---

IMPROVEMENT IN ELECTRIC STEAM-GAUGES.

---

*The Schedule referred to in these Letters Patent and making part of the same.*

---

TO ALL WHOM IT MAY CONCERN:

Be it known that I, EDWIN A. WOOD, of Utica, Oneida county, New York, have invented an Electro-Mercurial Column for Testing and Graduating Steam-Gauges.

The nature of my invention consists in adding a galvanic battery and index to the mercury column in such manner that the index will signal each successive pound or other amount of pressure upon the gauge to be tested without requiring the operator to watch the mercury column.

And I do hereby declare that the following is a full, clear, and exact description of the construction and operation of said invention, reference being had to the annexed drawing, making a part of this specification, which represents a sectional view of the mercury column, a front view of the index, battery, and connecting wires, and the force-pump and connecting tube.

A is the mercury-tube; $A^1$ is the siphon; $A^2$ $A^2$ are insulated metallic points in the tube A; $A^3$ $A^3$ are the connecting wires between points $A^2$ and insulated points $B^3$ on the face of the index; B is the index case; $B^1$ is a glass cover of the face; $B^2$ is the face; $B^3$ are the insulated points therein; $B^4$ the pointer; $B^5$ the handle thereof; $B^6$ the coiled wire connecting the pointer with one pole of the battery; C is a temporary magnet; $C^1$ is the armature with the bell-hammer $C^2$ connected therewith; $C^3$ is the bell; $C^4$ a retracting spring, attached to the hammer-arm; $C^5$ and $C^6$ adjusting screws for regulating the motion of the bell-arm; D and $D^1$ are connecting screws, for the opposite poles of the battery; E is the battery; F is the force-pump; $F^1$ is the reservoir; G is a tube, connecting the pump and gauge and siphon; $G^1$ and $G^1$ are nipples thereon to connect with the gauge to be graduated or tested; and H H are such gauges. The mercury-tube may be of iron, and terminate at its lower end in the form of an inverted siphon, or in a cistern. The tube is graduated upwards like the ordinary tube, but instead of marking the pressure therein, or on a scale to be attached thereto, there is inserted at each division a metallic point (platinum will be preferable) insulated in a plug of some non-conducting material, as India rubber, glass, or the like, inserted in the tube. If the tube is of glass or other non-conducting material, the metallic points need not be inserted in a non-conducting plug. Attached to each of said points $A^2$ is a wire, $A^3$, which extends to and is connected with similar insulated points on the face of the index to be described. The index consists of a case, B, on a pedestal, with a bell, $C^3$, surrounding the pedestal. The face $B^2$ is graduated like the dial of a gauge, with as many points thereon as there are wires leading from the mercury-tube, at each of which points are inserted metallic points, $B^3$, like those in the tube A, and each of such points on the face is connected by wires, $A^3$, with a corresponding point, $A^2$, on the tube A, the lower point on the tube A being connected with a point on the face, which is marked or numbered 0. The next point on the tube is connected with the next point on the face by the wire, and is marked on the face according to the weight of the mercury between the two points in the column, and so on, connecting each point on the tube with the next one on the face, and numbering or marking the points on the face the number of pounds of the mercury column at the corresponding point in the tube. The face B is covered with a glass cover, $B^1$, and there is inserted in the centre from the outside a handle, $B^5$, to the inner end of which, and between the glass and the face, is a pointer, $B^4$, which pointer is connected by the coiled wire $B^6$ with the magnet C, to be described. On the inside of the case is a common electro-magnet, C. The armature $C^1$ is also of ordinary form, and is extended into a bell-hammer arm, $C^2$, which arm is retracted by the coiled spring $C^4$, and the adjusting screws $C^5$ and $C^6$, on the outside of the case, regulate the motion of the arm. The pump is a common force-pump, and is connected by the tube G with siphon, and has a branch nipple, $G^1$, one or more, on which to screw the gauge or gauges to be graduated or tested, so that the pressure of the pump extends to the mercury in the siphon, and to the gauge or gauges. The battery E is a common galvanic battery, and one pole thereof is connected with the mercury column through the connecting wire $D^1$, while such mercury column is connected in turn through the points $A^2$ and wires $A^3$ with the points $B^3$ in the face of the case. The other pole of the battery is connected through the connecting screw D with one pole of the magnet, while the other pole of the magnet connects through the coiled spring $B^6$ with the pointer $B^1$. Thus a complete circuit may be formed by placing the pointer on any given point on the face of the index, and raising the mercury to the corresponding point in the tube A, and such circuit is broken by removing the pointer to a higher point, or suffering the mercury column to recede.

The operation will readily be understood from the description already given. The gauge to be graduated or tested is screwed on to the nipple $G^1$, and the battery properly connected with the siphon and temporary magnet. The mercury should stand in the siphon on a line with the lower point $A^2$ in the tube; and when the pointer is placed on the point 0, the bell should strike. If now the pointer is placed on the next point on the face, and the pump operated, the mercury will begin to rise in the tube and the index of the gauge begin to turn, and when the bell strikes, as it will as soon as the mercury in the tube reaches the point therein corresponding with the point on which the pointer rests, the gauge-index will stand at the point on the gauge-dial where is to be marked the pounds' pressure of the mercury column, being the number marked on the face of the index where the pointer stands, and so on until the whole gauge has been graduated. The mode of testing gauges is the same. Several gauges may be tested or graduated at the same time.

The advantages of this invention over others for the like purposes are its simplicity and cheapness, and its accuracy, while it allows the operator to graduate or test his gauge without having to watch the motion of the column of mercury.

I have described the simplest form of index, but it is apparent that it may be changed in many respects, and other methods than the use of a bell may be employed to signal the pressure of the mercury column. I do not therefore wish to restrict myself to the use of one of this form.

What I claim as new, and desire to secure by Letters Patent, is—

1. The mode, substantially as herein described, of indicating the pressure of the mercury column by means of insulated points in the mercury-tube connected with like points on the index.

2. Combining with an ordinary mercury column a galvanic battery, substantially as described, for the uses and purposes mentioned.

3. The mercury column and index, constructed and operating substantially as described.

EDWIN A. WOOD.

Witnesses:
   JOHN G. CROCKER,
   FRANCIS G. WOOD.